G. H. Reister,
Hay Loader.

No. 100,804.

Patented Mar. 15, 1870.

United States Patent Office.

GEORGE H. REISTER, OF WASHINGTON, IOWA.

Letters Patent No. 100,804, dated March 15, 1870, antedated February 26, 1870.

IMPROVEMENT IN HAY-RAKERS AND LOADERS.

The Schedule referred to in these Letters Patent and making part of the same.

*To all whom it may concern:*

Be it known that I, GEORGE H. REISTER, of Washington, in the State of Iowa, have invented a certain new and useful Improvement on Hay-Loaders; and I do hereby declare that the following is a full, clear, and exact description of the construction and operation of the same, reference being had to the accompanying drawings and to the letters and marks thereon, which said drawings form part of this specification, and represent a hay-loader constructed under my invention—

Figure 1:
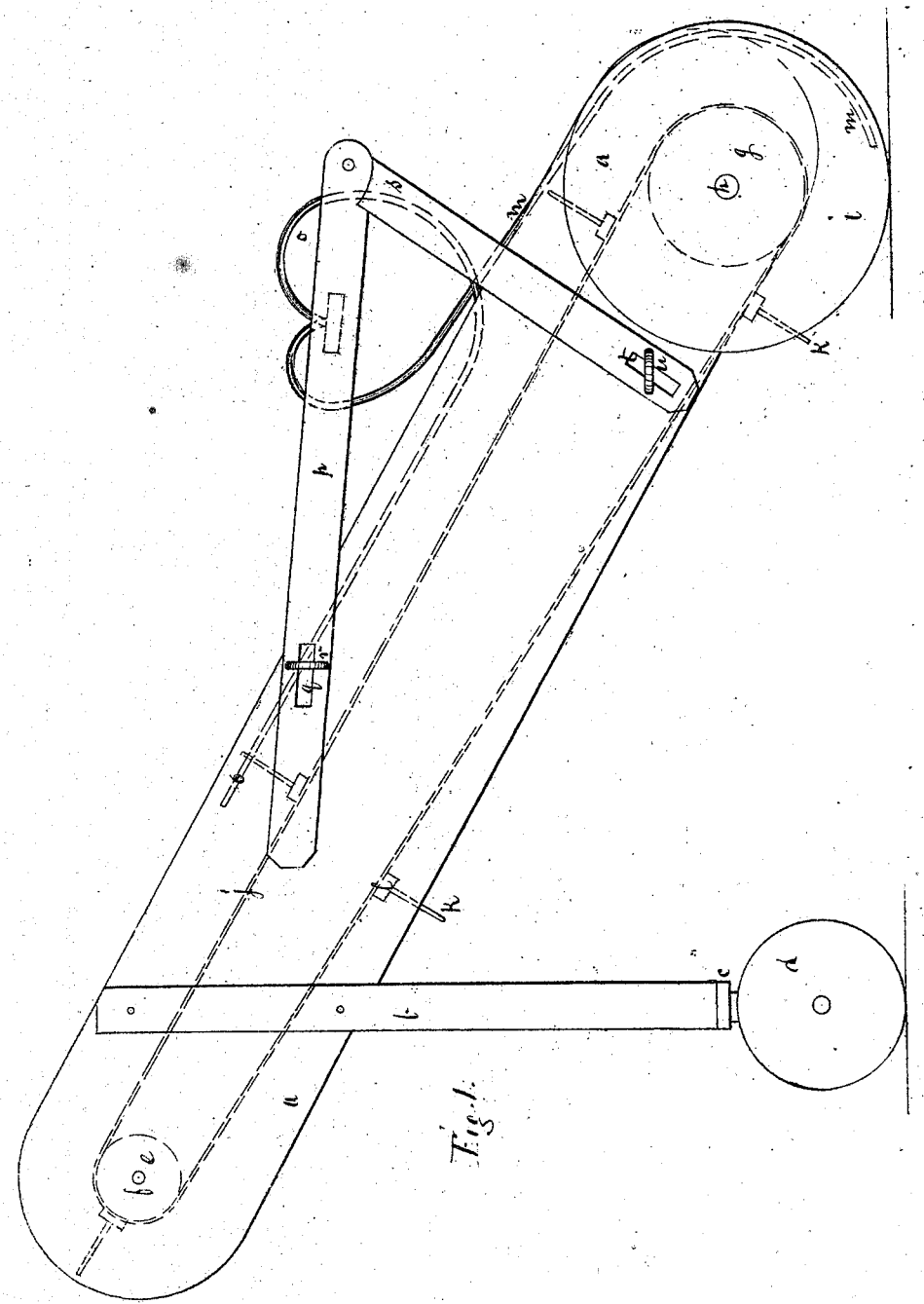

Figure 1 thereof being a side view of such loader, and

Figure 2:
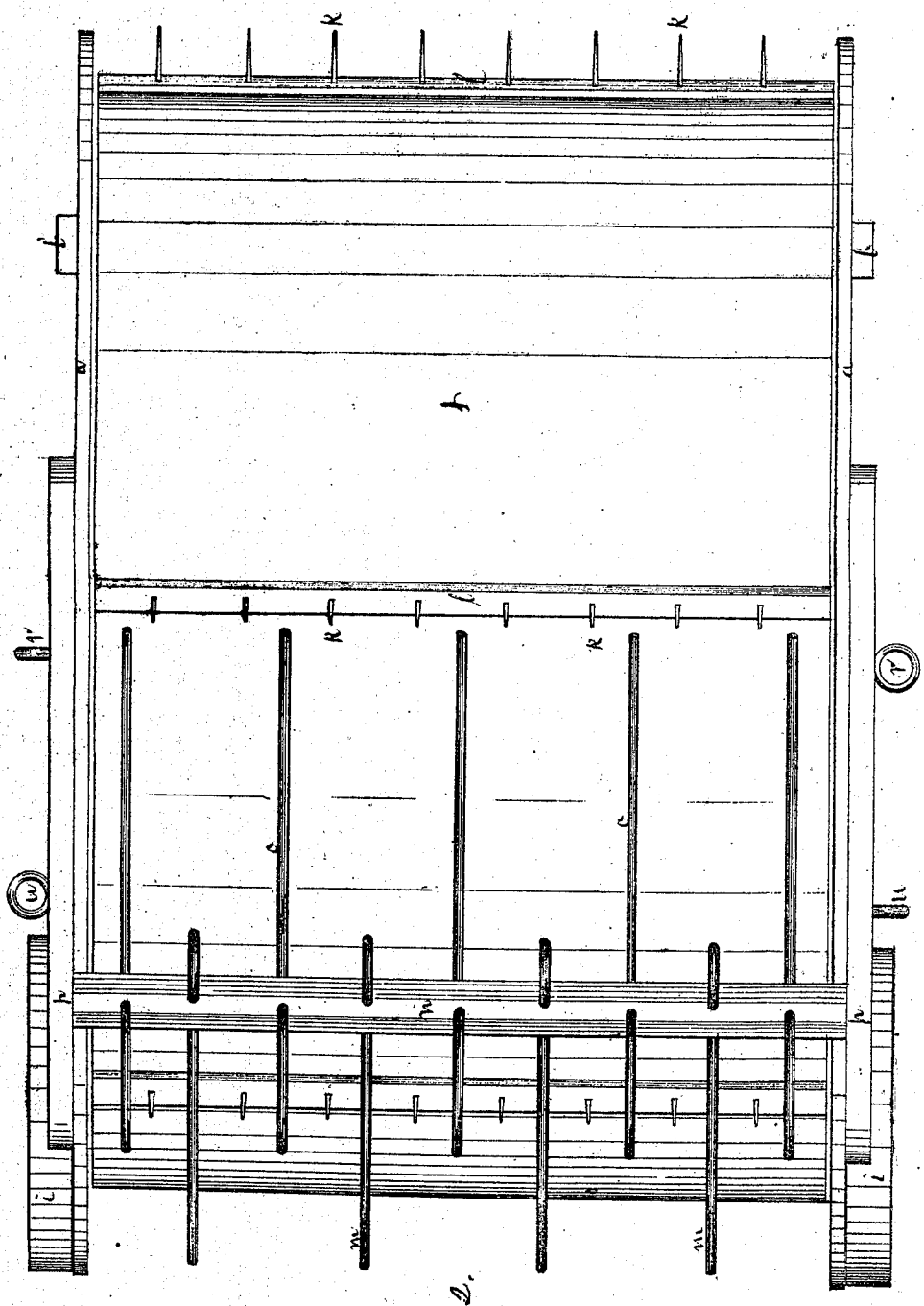

Figure 2, a top view of the same.

The same marks and letters on both of the figures refer to like parts.

This invention relates to that class of farming-machines, the functions of which have reference to the raking or gathering up of the hay from the ground and elevating and delivering it to the wagon or to such place as may be desired.

The side plates $a$ of this loader will be made of wood or other suitable material, and sustained in the proper position or inclination by vertical bars or supports $b$ to the cross-bar $c$, of which a guiding-truck, $d$, is attached.

At the upper end of the plates $a$ is a friction-roller, $e$, having its bearings $f$ in the plates, and at the lower end of the plates is a cylinder, $g$, also having bearings $h$ in the plates.

To the bearings $h$ the driving-wheels $i$ are affixed.

An endless apron or platform, $j$, passes around the cylinder $g$ and friction-roller $e$.

To this endless apron the teeth $k$, properly secured to slats $l$, are attached.

The teeth $m$, for gathering the hay, are affixed to the bar $n$.

Other teeth, $o$, for guiding the hay, are also affixed to the bar $n$.

Both of these sets of teeth are curved, and so bent toward the bar as to give them some elasticity or spring, by which they act more efficiently and safely on the hay.

The bar $n$ is connected to the side bars $p$, which, by slots $q$ and thumb-screws $r$, are attached to the plates $a$; and the bars $p$ are also attached to inclined bars $s$, the bars $s$ also being connected to the side plates $a$ by slots $t$ and thumb-screws $u$.

The connection between the bars $p$ and $s$ is a rule-joint connection, allowing of the movement of the end of the one bar on the other.

This manner of connecting the bars $p$ and $s$ to the plates and to each other allows of the adjustment of the teeth $m$ and the adapting of them to the quantity of hay to be elevated, the adjustment permitting of the elevating or lowering of the teeth as well as moving them backward or forward.

In this adjustment of the teeth $m$, the teeth $a$ are raised or lowered, so that, by the one movement for adjusting, the gathering and the guiding-teeth are both acted on.

From this description of the construction of this loader, it will readily be seen that when it is attached to the wagon, as the wagon is drawn forward, the hay will be gathered up and elevated on the endless apron and delivered into the wagon.

What I claim as my invention, and desire to secure by Letters Patent, is—

The arrangement of the arms $p$ and $s$, bar $n$, with the teeth, in relation to each other and to the plates $a$, whereby the gathering and guiding-teeth may both be adjusted, substantially as and for the purposes herein recited.

This specification signed this 9th day of June, 1869.

GEO. H. REISTER.

Witnesses:
N. EVERSON,
E. WALSWORTH.